United States Patent [19]
Rogers et al.

[11] Patent Number: 4,564,849
[45] Date of Patent: Jan. 14, 1986

[54] COMPENSATION CIRCUIT FOR SYNCHRONIZING IMAGE MOTION WITH A MOVABLE RECORDING MEDIUM

[75] Inventors: Jerrold J. Rogers, Beaverton; Judd L. Sirotiak, Tualatin, both of Oreg.

[73] Assignee: Tektronix, Inc., Beaverton, Oreg.

[21] Appl. No.: 704,899

[22] Filed: Feb. 22, 1985

Related U.S. Application Data

[63] Continuation of Ser. No. 546,781, Oct. 27, 1983, abandoned.

[51] Int. Cl.$^4$ .................. G01D 9/42; G01D 15/24
[52] U.S. Cl. .................. 346/110 R; 346/136; 358/216; 307/116
[58] Field of Search .................. 346/110 R, 136, 108, 346/161; 358/216, 338, 348; 307/116, 118

[56] References Cited

U.S. PATENT DOCUMENTS 4,172,259 10/1979 Lowe .................. 346/110 R

Primary Examiner—E. A. Goldberg
Assistant Examiner—Mark Reinhart
Attorney, Agent, or Firm—George T. Noe; Robert S. Hulse; Francis I. Gray

[57] ABSTRACT

A compensation circuit is described for use in a line scan type recording apparatus where an electron beam is scanned on the face of a fiber optic cathode-ray tube (FOCRT) in synchronization with a movable recharging medium. The compensation circuit includes a charge pump circuit, an integrator circuit, and a current source. The charge pump circuit draws a constant charge from the integrator circuit in response to a repetitive series of stepper pulse corresponding to the velocity changes in the recording medium. The current source generates a constant current that flows into the integrator circuit and is equal to the average DC current flowing out of the integrator circuit via the charge pump circuit. The output voltage of the integrator circuit is used for controlling the vertical displacement of the electron beam of the FOCRT in synchronization with the movable recording medium. A DC stabilization circuit and a sample-and-hold circuit may be included for stabilizing the average DC voltage level of the integrator output voltage and for removing the sweep and recovery noise from the integrator output voltage respectively.

8 Claims, 9 Drawing Figures

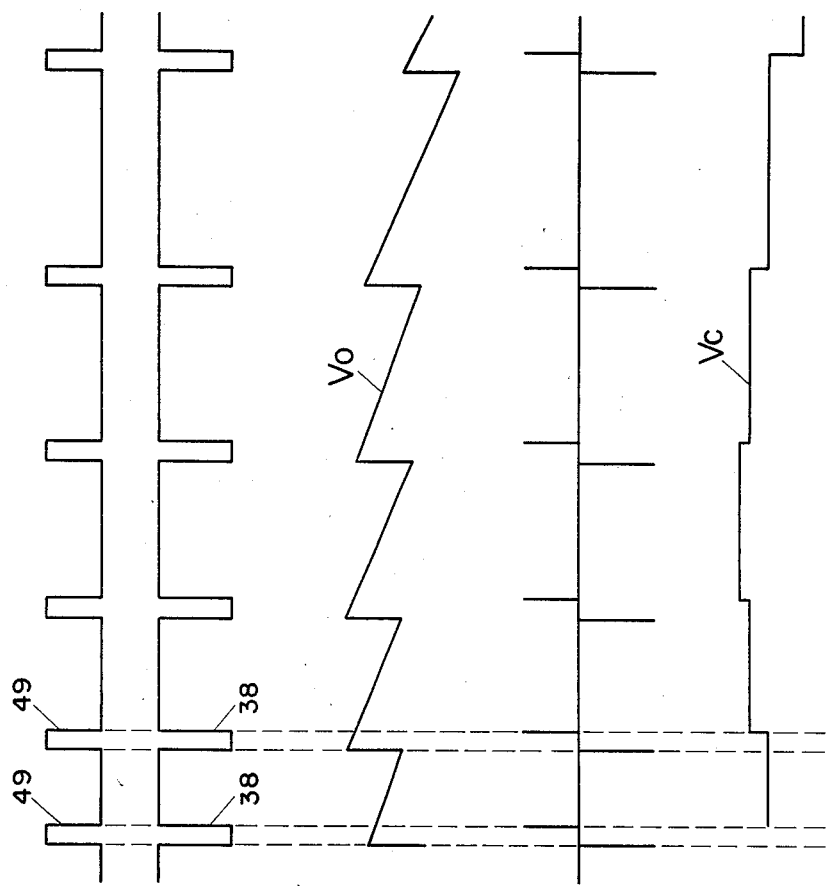

COMPENSATION CIRCUIT FOR SYNCHRONIZING IMAGE MOTION WITH A MOVABLE RECORDING MEDIUM

This is a continuation of application Ser. No. 546,781 filed Oct. 27, 1983 and now abandoned.

BACKGROUND OF THE INVENTION

The present invention relates generally to a compensation circuit for synchronizing image motion with a movable recording medium and more specifically to a compensation circuit for use in a line scan type recording apparatus.

In a line scan recorder, a recording medium, such as photo-sensitve paper, is moved in a first direction at a constant velocity while a recording beam, such as an electron beam from a cathode-ray tube, is scanned back and forth on the recording medium in a direction perpendicular to the movement of the recording medium. The intensity of the recording beam is modulated by input data producing a gray-scale image on the recording medium.

One example of a prior art recording apparatus uses photo-sensitive paper as the recording medium and an electron beam of a fiber-optic cathode-ray tube (FOCRT) as the recording beam. In such a line scan recorder, it is important to maintain the photo-sensitive paper at a constant velocity to obtain high quality recording images. Although the photo-sensitive paper may travel at a constant average speed, it is difficult to avoid short term paper velocity changes or errors due to mechanical characteristics of the paper feed mechanism. When the photo-sensitive paper moves faster, the line density is reduced and the image becomes lighter. Likewise when the photo-sensitive paper moves slower, the line density is increased and the image becomes darker. These short term changes in the velocity of the photo-sensitive paper appear as light and dark bands on the recorded images.

One solution to the problem is disclosed in U.S. Pat. No. 4,172,259. FIG. 1 is a simplified block diagram of a conventional line scan recorder with compensation means shown in the prior art. Photo-sensitive paper 6 is drawn out of paper drum 16 by drive roller 8 under the control of paper drive means 4 and moved at a constant average velocity across the face plate 14 of FOCRT 2. X-axis circuitry 24 produces electrical signals that cause the electron beam of FOCRT 2 to scan the faceplate 14 while at the same time Z-axis circuitry 14 modulates the intensity of the electron beam in response to the input data. Thus, a gray scale latent image is formed on the paper 6 to be developed by heater means (not shown).

Velocity sensing means 26 includes a light emitting means, a photo sensor and an interrupter wheel interposed between the light emitting means and the photo sensor. The interrupter wheel is coupled to the drive roller 8, and has slotted openings along its circumference. The velocity sensing means 26 generates a pulse stream, the frequency of which is proportional to the angular velocity of the interrupter wheel. The angular velocity is, in turn, proportional to the paper velocity. Therefore, the frequency of the pulse streams represents the paper velocity.

Compensation means 28 includes a frequency-to-voltage converter 30, a long time constant differentiator 32 and an integrator 34. Frequency-to-voltage converter 30 and differentiator 32 produce a voltage signal proportional to the paper velocity errors, and integrator 34 converts the signal into a signal which represents the time integral of each such error. The output of integrator 34 is applied to Y-axis deflection circuit 20 to control the vertical movement of the line scans of the electron beam so as to maintain a constant relative velocity between scan lines of the recording beam and the recording medium.

A disadvantage of the prior art technique is the complexity of the compensation means. Moreover, it is not readily adaptive to a recording apparatus having an adjustable paper speed.

SUMMARY OF THE INVENTION

The present invention is directed to a compensation means for use in a line scan type recording apparatus where an electron beam is scanned on the face of a fiber optic cathode-ray tube (FOCRT) in synchronization with a movable recording medium. The compensation means includes a charge pump circuit, an integrator circuit, and a current source. The charge pump circuit is coupled to receive a series of stepper pulses having a pulse repetition rate corresponding to the velocity of the recording medium. The charge pump circuit draws a constant charge from the integrator circuit each time a stepper pulse is received. The current source generates a constant current that flows into the integrator circuit and is equal to the average DC current flowing out of the integrator circuit via the charge pump circuit. The output voltage of the integrator circuit is used for controlling the vertical displacement of the electron beam of the FOCRT in synchronization with the movable recording medium.

In a further embodiment of the present invention, a DC stabilization circuit and a sample-and-hold (S/H) circuit are included. The DC stabilization circuit is coupled between the input and output terminals of the integrator circuit and acts as a resistor for stabilizing the average DC voltage level of the integrator output voltage. In some applications where a line scan type recording apparatus has a variable paper speed, the DC stabilization circuit acts as a variable resistor. The S/H circuit is coupled to the output terminal of the integrator circuit and removes the sweep and recovery noise from the integrator output voltage.

It is therefore an object of the present invention to provide a line scan type recording apparatus having a simple and improved compensation means to compensate for paper velocity errors.

It is another objective of the present invention to provide a line scan type recording apparatus having compensation means suitable for a wide range of paper speeds.

BRIEF DESCRIPTION OF THE DRAWINGS

FIGS. 5A–5E show waveforms at important points in the circuit in FIG. 4.

DETAILED DESCRIPTION OF THE INVENTION

Figures 1, 2:
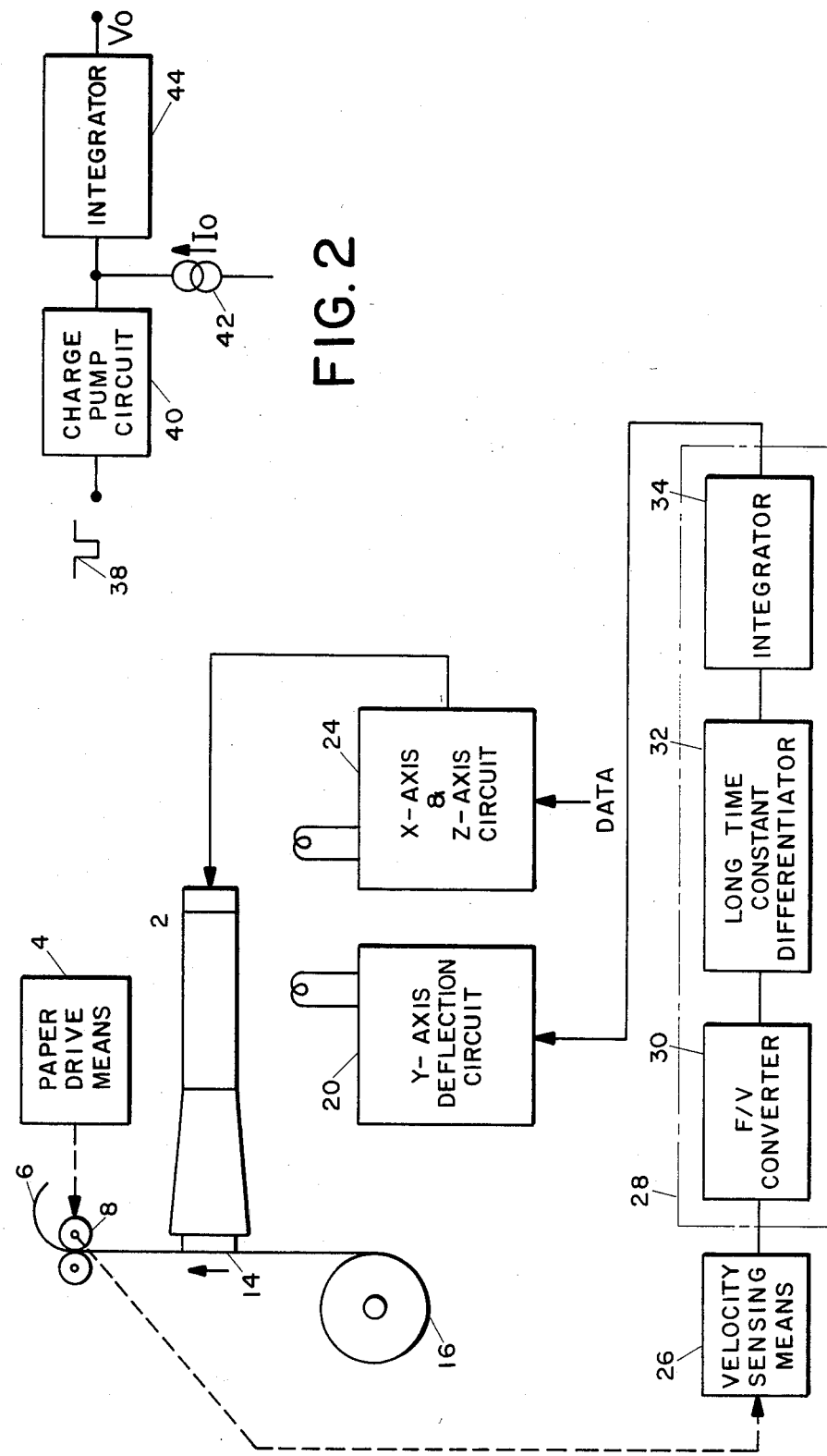
FIG. 1 is a simplified block diagram of a conventional line scan recorder.
FIG. 2 is a simplified block diagram of the improved compensation means for a recording apparatus in accordance with the present invention.

FIG. 2 is a simplified block diagram of the improved compensation means for a recording apparatus in accordance with the present invention where the improved compensation means replaces compensation means 28 of FIG. 1. The improved compensation means includes a charge pump circuit 40, a current source 42, and an integrator 44. Charge pump circuit 40 draws a certain constant charge from integrator 44 each time a stepper pulse 38, which is repetitive in nature, is received from velocity sensing means 26. Current source 42 generates a constant current $I_O$ which flows into integrator 44. Constant current $I_O$ is chosen to be equal to the average DC current flowing out of integrator 44 via charge pump circuit 40. The current $I_O$ is determined so as to supply, during the average stepper pulse period, a charge to integrator 44 equal to the charge taken out of integrator 44 by charge pump circuit 40. The output voltage $V_O$ of integrator 44 is used for controlling the vertical or Y-axis deflection circuit 20. As the paper velocity becomes faster than the average velocity, the pulse repetition rate of the stepper pulses 38 increases and the output voltage $V_O$ goes positive. Conversely, as the paper velocity becomes slower than the average velocity, the pulse repetition rate of the stepper pulses decreases and the output voltage $V_O$ goes negative. Thus, the output voltage $V_O$ is produced in response to paper velocity errors.

Figure 3:
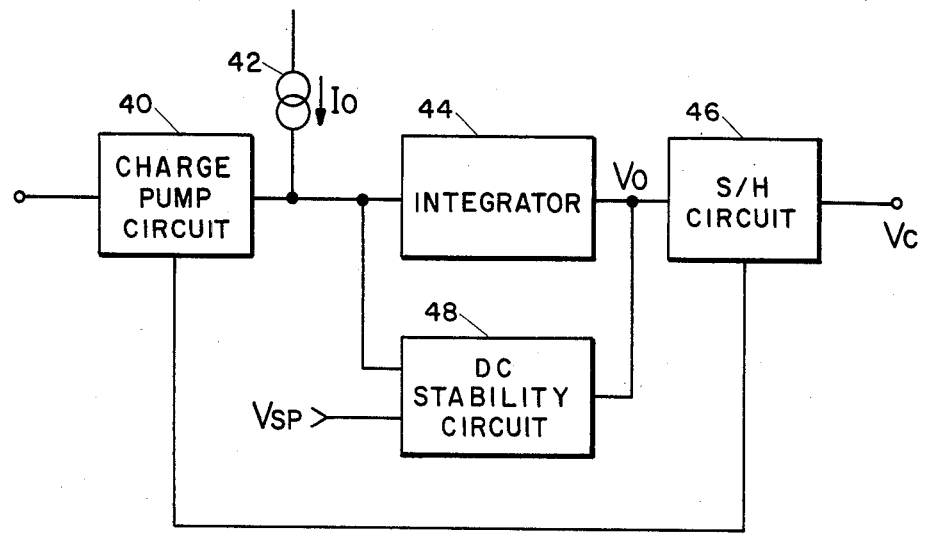
FIG. 3 is a block diagram of the improved compensation means according to the present invention.

FIG. 3 is a block diagram of a further improved compensation means for a recording apparatus according to the present invention. This compensation means includes a sample-and-hold (S/H) circuit 46 and a DC stability circuit 48 in addition to the compensation means shown in FIG. 2. The DC stability circuit 48 is connected between the input and output of integrator 44 and provides DC stability of the output voltage $V_O$ from integrator 44. The DC stability circuit 48 acts as a variable resistor, the resistance of which is controlled in response to the paper speed voltage $V_{sp}$. The time constant of the DC stability circuit 48 is much longer than the pulse repetition rate of the stepper pulses so as not to effect the alternating correction voltage $V_O$. In some applications where only a fixed paper speed is used, the DC stability circuit may be a resistor connected between the inverting input terminal and the output terminal of integrator 44.

The S/H circuit 46 is provided for removing sweep and recovery noise from the output voltage $V_O$ of integrator 44. The S/H circuit samples the output voltage $V_O$ at a given point and holds the sampled voltage during a given stepper pulse period.

Figure 4:
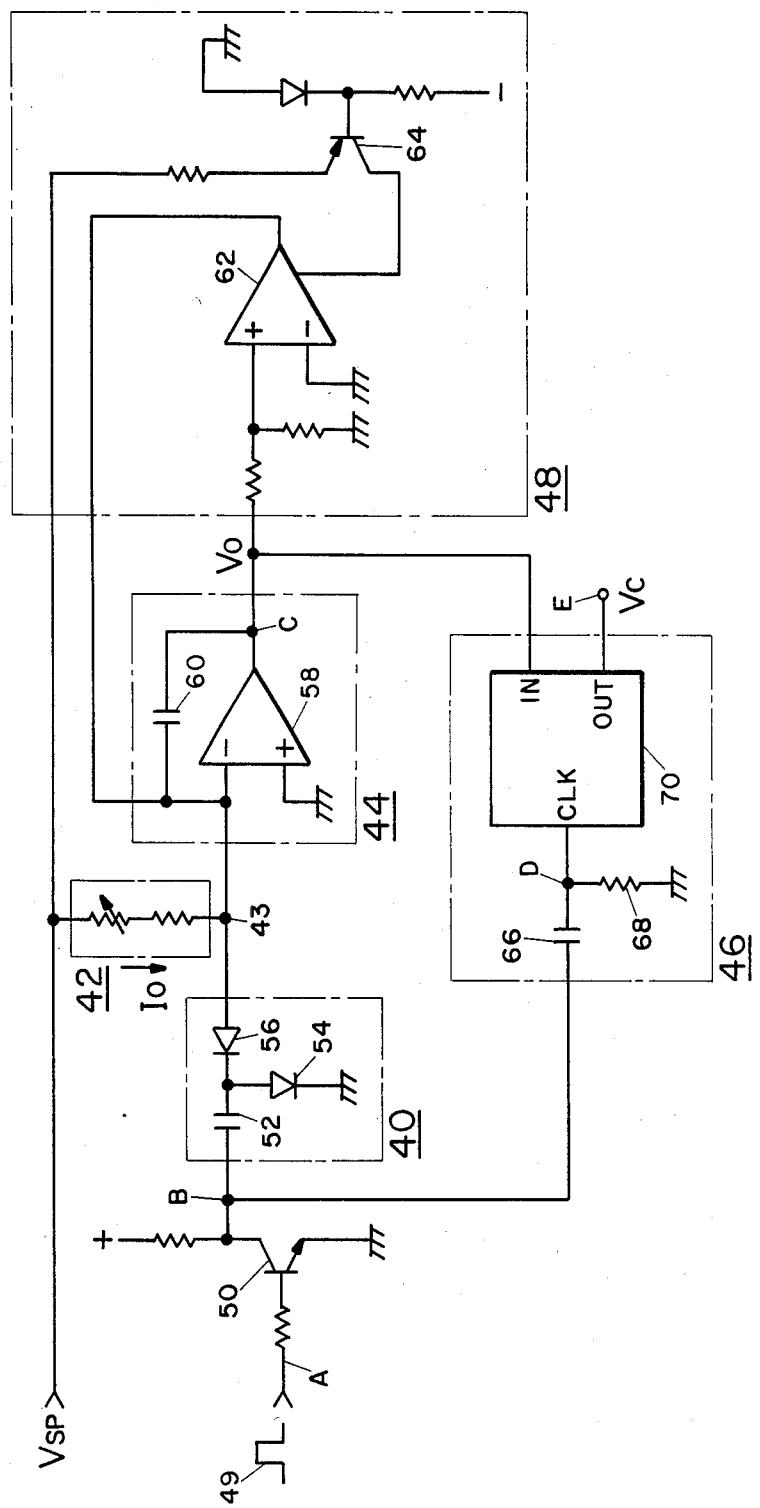
FIG. 4 is a circuit schematic of one embodiment of the improved compensation means according to the present invention.

FIG. 4 is a circuit schematic of one embodiment of the improved compensation means for a recording apparatus in accordance with the present invention. Identical reference numbers are used to represent similar components as those in FIGS. 2 and 3. The embodiment as shown in FIG. 4 will be explained with reference to the waveforms shown in FIGS. 5A through 5E.

Pulses 49, represented by FIG. 5A, from the velocity sensing means 26 are inverted into stepper pulses 38, represented by FIG. 5B via transistor 50. Stepper pulses 38 are applied to both the charge pump circuit 40 and the S/H circuit 46. Charge pump circuit 40 includes capacitor 52 and diodes 54 and 56. Integrator 44 includes an operational amplifier 58 having inverting and non-inverting input terminals with the non-inverting terminal coupled to ground, and an output terminal. A capacitor 60 is connected between the inverting input terminal and the output terminal of the operational amplifier. Current source 42 is simply made of resistors coupled between voltage source $V_{sp}$ and node 43 which is at virtual ground in this embodiment. Voltage $V_{sp}$, applied to current source 42, is switched in response to two or more paper speeds selected by an operator. Therefore, current $I_O$ from current source 42 is also switched according to the selected paper speed.

DC stability circuit 48 includes operational transconductance amplifier 62, e.g. type CA 3080 (RCA), and transistor 64. Paper speed voltage $V_{sp}$ is converted into current via the emitter circuit resistor of transistor 64 and applied to an amplifier bias input of operational amplifier 62 by transistor 64. Thus, operational amplifier 62 acts as a variable resistor having a resistance value responsive to voltage $V_{sp}$.

Since the DC stability circuit 48 as connected across capacitor 60 has a very long time constant with respect to the pulse repetition rate of the stepper pulses and the time constant is responsive to voltage $V_{sp}$, the correction signal created is not affected by this circuit. Even if the current $I_O$ from current source 42 is unable to perfectly balance the average DC current flowing out of integrator 44, the DC stability of the output voltage $V_O$ is maintained by DC stability circuit 48. If the current $I_O$ is not sufficiently accurate, the output voltage $V_O$ will either drift in a positive or negative direction depending on whether current source 42 supplies a little extra current to or takes a little extra current away from integrator 44. The DC voltage level of the output voltage $V_O$ will be established at some level corresponding to the accuracy of the current $I_O$. If the current $I_O$ is perfectly accurate, the output voltage $V_O$ will have a 0 volts DC level.

S/H circuit 46 includes capacitor 66, resistor 68 and S/H element 70. The S/H circuit 46 removes sweep and recovery noise from the voltage output $V_O$, FIG. 5C, of integrator 44. Capacitor 66 and resistor 68 produce sampling pulses, FIG. 5D, that are applied to the CLK input terminal of S/H element 70 which may be of any conventional design. The output voltage $V_O$ of integrator 44 is applied to the IN input terminal of S/H element 70. Each time a positive pulse is received at the CLK input terminal of S/H element 70, the voltage level on the In input terminal of S/H element 70 is coupled and held at the output terminal of the device as output voltage $V_c$, FIG. 5E. Note that only level changes remain after S/H circuit 46. The output voltage $V_c$ is used to control the vertical position of the scan line on the FOCRT via Y-axis deflection circuit 20.

As is apparent from the waveform in FIG. 5C, the output voltage $V_O$ increase by a certain constant voltage each time the stepper pulse is applied. This constant voltage represents the constant charge that is taken out of integrator 44 by one stepper pulse. The negative going portion of the waveform in FIG. 5C represents the current $I_O$ from the current source 42 that is flowing into integrator 44. The ramp slope is constant and determined by the current $I_O$ and the capacitance of capacitor 60. If the stepper pulse spacing is constant, that is, if no paper velocity error is produced, the charge taken out of integrator 44 by one stepper pulse is just cancelled by the current $I_O$ during one stepper pulse period. As a result, S/H circuit 46 does not produce the correction signal. If the stepper pulse spacing is not constant, that is paper velocity errors exist, the charge taken out of the integrator 44 by one stepper pulse is more or less cancelled by the current $I_O$ during one stepper pulse period depending on the length of the period. Thus, the output voltage $V_O$ of integrator 44 looks like the waveform in FIG. 5C and the compensation voltage $V_C$, FIG. 5E, is produced at the output terminal of S/H circuit 46. The output voltage $V_C$ of S/H circuit 46 may be applied to a bandpass filter to eliminate undesired signal frequencies before being applied to the Y-axis deflection circuit 20.

As is understood from the foregoing description, the present invention provides very simple compensation means to compensate for the short term paper velocity errors. The error detection sensitivity is fairly high and can be linear to paper speed variations. The response is also very fast. This invention is easily adaptive to various recording apparatus having a fixed or variable paper feed without the need for readjustment. In addition, no calibration adjustment would be needed by using reasonably close tolerance parts.

While there has been shown and described only one preferred embodiment of the present invention, it will be apparent to those skilled in the art that many changes and modifications may be made without departing from the broader aspects of this invention. Consequently, this invention should be interpreted to cover such changes and modifications.

We claim:

1. A compensation circuit for synchronizing image motion with a movable recording medium in a line scan type recording apparatus comprising:
   a charge pump coupled to receive an electrical signal representative of an average velocity and short term velocity changes in a movable recording medium;
   an integrator circuit coupled to the output of said charge pump; and
   a current source interposed therebetween wherein said charge pump, in response to said electrical signal, draws a current from said integrator representative of said average velocity and short term velocity changes of said movable recording medium and wherein said current source produces a constant current that is coupled to said integrator and is representative of said average velocity of said movable recording medium such that an output electrical signal is produced by said integrator that is representative of short term velocity changes of said movable recording medium.

2. The circuit according to claim 1 including means responsive to movement of said recording medium for generating said electrical signal representative of an average velocity and short term velocity changes, said signal comprising a series of pulses having a repetition frequency proportional to the velocity of said recording medium.

3. The circuit according to claim 1 wherein said current source comprises resistance means coupled to a voltage related to said average velocity.

4. The circuit according to claim 1 further including DC stability means connected in parallel relation with said integrator circuit and acting as a shunt resistance for adjusting the discharge time constant of said integrator circuit, said DC stability means being responsive to selected average velocity.

5. The circuit according to claim 4 wherein said integrator circuit comprises a integrator including an operational amplifier with an inverting, a non-inverting and an output terminal, said non-inverting terminal being grounded, and a capacitor connected between said inverting and output terminals, and said DC stability means comprises an amplifier having its signal output coupled to the input of said integrator, having its signal input coupled in comparison relation to the output of said integrator and having a bias input coupled to receive a value proportional to selected average velocity.

6. A compensation circuit for synchronizing image motion with a movable recording medium in a line scan type recording apparatus comprising:
   a charge pump responsive to movement of said recording medium for providing a signal representative of the velocity of said recording medium;
   a source of relatively constant current, and
   an integrator coupled in current exchanging relation with said current source and coupled in current exchanging relation with said charge pump in an opposite polarity sense such that current from said current source and current from said charge pump substantially balance at said integrator to provide an integrator output representative of short term velocity changes in said movable recording medium.

7. A compensation circuit for synchronizing image motion with a movable recording medium in a line scan type recording apparatus comprising:
   means responsive to movement of said recording medium for providing a series of pulses having a repetition frequency related to the velocity of said recording medium,
   an integrator circuit supplying an output for providing short term adjustment in the line scan position, and
   a charge pump receiving said series of pulses and coupled in charge exchanging relation with said integrator circuit causing the charge on said integrator circuit to be a function of the frequency of said pulses.

8. The circuit according to claim 7 further including means for providing a substantially constant current in charge exchanging relation with said integrator circuit in an opposite polarity sense to charge exchange with respect to said charge pump.

* * * * *